United States Patent
Holeman, Sr.

(10) Patent No.: US 7,400,615 B2
(45) Date of Patent: Jul. 15, 2008

(54) SYSTEM AND METHOD FOR DETERMINISTIC REGISTRATION FOR COMMUNICATION NETWORKS

(76) Inventor: James L. Holeman, Sr., 8018 Tea Garden Rod, Huntsville, AL (US) 35802

( * ) Notice: Subject to any disclaimer, the term of this patent is extended or adjusted under 35 U.S.C. 154(b) by 801 days.

(21) Appl. No.: 10/686,402

(22) Filed: Oct. 15, 2003

(65) Prior Publication Data

US 2005/0083963 A1 Apr. 21, 2005

(51) Int. Cl.
*H04B 7/212* (2006.01)
(52) U.S. Cl. ....................... 370/348; 370/447
(58) Field of Classification Search ............... 370/328, 370/347, 348, 349, 458, 462; 455/435.1
See application file for complete search history.

(56) References Cited

U.S. PATENT DOCUMENTS

| | | | |
|---|---|---|---|
| 4,491,946 A | 1/1985 | Kryskow, Jr. et al. | |
| 4,506,360 A | 3/1985 | Kryskow, Jr. et al. | |
| 4,852,091 A | 7/1989 | Li | |
| 5,377,187 A | 12/1994 | Spiotta et al. | |
| 5,413,411 A | 5/1995 | Ebersohl | |
| 5,712,852 A | 1/1998 | Wilson | |
| 6,091,738 A | 7/2000 | Tsujikado et al. | |
| 6,178,445 B1 | 1/2001 | Dawkins et al. | |
| 6,192,397 B1 | 2/2001 | Thompson | |
| 6,256,492 B1* | 7/2001 | Bilgic | 455/418 |
| 6,574,211 B2* | 6/2003 | Padovani et al. | 370/347 |
| 6,771,634 B1* | 8/2004 | Wright | 370/349 |
| 7,009,994 B2* | 3/2006 | Bahl | 370/458 |
| 7,023,833 B1* | 4/2006 | Aiello et al. | 370/348 |
| 7,068,677 B1* | 6/2006 | Arai et al. | 370/447 |
| 2002/0122406 A1* | 9/2002 | Chillariga et al. | 370/347 |
| 2004/0090983 A1* | 5/2004 | Gehring et al. | 370/458 |
| 2005/0276255 A1* | 12/2005 | Aiello et al. | 370/348 |

* cited by examiner

*Primary Examiner*—Ricky Ngo
*Assistant Examiner*—Kan Yuen
(74) *Attorney, Agent, or Firm*—Lanier Ford Shaver & Payne P.C.

(57) ABSTRACT

In one embodiment, a method for deterministic registration for communication networks comprises transmitting a node register command over a network, the node register command comprising a first plurality of bits and a second plurality of bits, the first and second plurality of bits addressing a range of nodes that should respond to the node register command, and a plurality of time slot delays, during each of the plurality of time slot delays, listening to the network for a response from a node in the range of nodes, the node determined by each of the plurality of time slot delays, and responsive to detecting a response, determining a responding node corresponding to the response and designating the responding node as registered.

8 Claims, 10 Drawing Sheets

SYSTEM AND METHOD FOR DETERMINISTIC REGISTRATION FOR COMMUNICATION NETWORKS

BACKGROUND

1. Field

The present invention relates generally to registration systems and, more particularly, to registering nodes in a communication network.

2. Description of the Related Art

In conventional time division multiplex data communication systems where the exact participants are unknown, a procedure must exist to account for and handle the possibility of messages being transmitted at substantially the same time and, thus, being "garbled." The procedures to handle the garbled messages vary depending on the communication system. In a classic ALOHA network, a network participant transmits its message and listens at the same time, or after some predefined delay. If the transmitting network participant hears its own garbled message, then the network participant backs-off and waits a predetermined amount of time before retransmitting its message.

A variation to the classic ALOHA network is the slotted ALOHA network scheme. Slotted ALOHA improves on the performance of a pure ALOHA network by requiring the network participants to transmit within predefined time boundaries. A drawback to this approach is its requirement that one participant provide a timing marker for the other network participants.

Carrier Sense Multiple Access (CSMA) networks provide an improvement over ALOHA networks by requiring that each participant listen for another transmission before attempting to transmit. In Carrier Sense Multiple Access with Collision Detection (CSMA/CD) schemes (e.g., IEEE 802.3), a sender (i.e., a transmitting participant) must determine that the voltage level on the medium is not greater than that generated by the sender, (i.e., itself). If the detected voltage level is greater, a collision is detected (e.g., another participant is also transmitting). In IEEE 802.3, the sender will then follow a binary exponential back-off scheme until it can send its message in the clear (i.e., without collision).

Multiple Access with Collision Avoidance (MACA) techniques use the broadcast of RTS and CTS messages to minimize the likelihood of collisions. However, when a collision does occur, a binary exponential back-off scheme is used to determine when a retry is to be attempted.

The aforementioned methodologies have at least two things in common. First, each participant in the network is responsible for determining if a collision has occurred. Second, retries occur at random times after the collision, either over a fixed period of time or over a period of time that continually expands, possibly exponentially. These two factors are the basis for potential drawbacks with the aforementioned schemes.

One drawback is that each unit in the network must be capable of detecting collisions, potentially even while the unit is transmitting a message. In radio-frequency-based networks, this may be a difficult, if not impossible, task. Another drawback is that, if a network is lightly loaded and the time within which units may retry transmissions after detecting a collision is fixed, there may be a significant amount of wasted time. Alternatively, if the network is heavily loaded, collisions may be excessive, and no message gets through. If the retry time is permitted to expand, then the delay time might, again, be excessive.

One possible solution to the bus contention and message collision problems is to use a command-response scheme. The command-response approach requires a primary, or "base," unit that controls all communication between the network participants. That is, the secondary, or "remote," units will not transmit unless commanded by the base. While this addresses the bus contention problem once the network is established, a drawback is the requirement that the base unit know the identifiers of all remote units on the network. The problem of initially registering the remote units into the network when their number and identifiers are unknown still remains. One approach would be to use the aforementioned collision resolution methodologies to initially set up the network, but, this would incur all the problems inherent in the collision resolution methodologies, if only for the initialization phase.

One of the inherent problems is potential and likelihood of collisions. Where a network contains a large number of nodes, it is very likely that a substantial number of these nodes will be simultaneously transmitting during the initialization phase and, thus, causing a collision. The voltage or energy level of a collision is proportional to the number of nodes that participated in or contributed to the collision, and a high voltage or energy level associated with a collision can have damaging consequences.

For example, in a radio frequency (RF) network with a large number of nodes capable of communicating with one another, a collision involving a large number of these nodes will result in a substantial increase of energy in the RF field. The resulting increase of energy in the RF field can have drastic consequences depending on the environment in which the RF network is operating. By way of example, an increase of energy in the RF field can cause the detonation of energy sensitive devices or materials, can have harmful side effects for humans or animals, as well as other undesirable side effects. Therefore, it may be important to limit the number of nodes (i.e., transmitters) that can transmit at any one time, thus, limiting the energy in the RF field by reducing the interference and RF noise.

Thus, a system and method for initializing a data communication network without a priori knowledge of the identity of the node addresses in the network, and which avoids the issues and problems associated with collision resolution methodologies is desired. Additionally, a system and method of limiting the number of nodes that can transmit at any one time is also desired. Furthermore, a system and method of registration that is accomplished in a deterministic amount of time is likewise desired.

SUMMARY

In one embodiment, a method for deterministic registration for communication networks comprises transmitting a node register command over a network, the node register command comprising a first plurality of bits and a second plurality of bits, the first and second plurality of bits addressing a range of nodes that should respond to the node register command, and a plurality of time slot delays, during each of the plurality of time slot delays, listening to the network for a response from a node in the range of nodes, the node determined by each of the plurality of time slot delays, and responsive to detecting a response, determining a responding node corresponding to the response and designating the responding node as registered.

In another embodiment, a method for registering during a deterministic registration process comprises, at a node, receiving a node register command addressing a range of nodes, the node register command comprising a plurality of time slot delays, determining whether the node is in the range of addressed nodes, responsive to determining that the node is in the range of addressed nodes, waiting for a proper time slot delay, the proper time slot delay being one of the plurality of time slot delays, the proper time slot delay corresponds to the node, and transmitting a message during the proper time slot delay, the message being a response to the node register command.

In still another embodiment, a computer-readable storage medium having stored thereon computer instructions that, when executed by a computer, cause the computer to transmit a node register command over a network, the node register command comprising a first plurality of bits and a second plurality of bits, the first and second plurality of bits addressing a range of nodes that should respond to the node register command, and a plurality of time slot delays, each of the plurality of time slot delays designated for one of the range of nodes to transmit a response message, during each of the plurality of time slot delays, listen to the network for the response message, and responsive to detecting a response message, determine a responding one of the range of nodes that transmitted the response message and designate the one of the range of nodes as registered.

In yet another embodiment, a computer-readable storage medium having stored thereon computer instructions that, when executed by a computer, cause the computer to receive a node register command addressing a range of nodes, the node register command comprising a plurality of time slot delays, determine whether to respond to the node register command, and responsive to determining to respond to the node register command, transmit a message during an assigned time slot delay, the assigned time slot delay being one of the plurality of time slot delays, the message being a response to the node register command.

In a further embodiment, a method for calibrating a receiver comprises, during a first portion of a time slot delay, determining a level of ambient noise in a network, determining a ceiling of the level of ambient noise, setting a threshold for a good signal to a predetermined level above the ceiling of the level of ambient noise, and during a second portion of the time slot delay, listening to the network for a signal.

In a still further embodiment, a system for deterministic registration for communication networks comprises a means for transmitting a node register command over a network, the node register command addressing a plurality of nodes that should respond to the node register command, the node register command comprising a plurality of time slot delays, each of the plurality of time slot delays designated for one of the plurality of addressed nodes to transmit a response message, a means for detecting a transmission of a response message during each of the plurality of time slot delays, a means for determining a responding node responsive to detecting a response message, the responding node being one of the plurality of addressed nodes, and a means for designating the responding node as registered.

In a yet further embodiment, a system for registering during a deterministic registration process comprises a means for receiving a node register command, the node register command addresses a plurality of nodes, the node register command comprising a plurality of time slot delays, a means for determining whether to respond to the node register command, and a means for transmit a message during an assigned time slot delay in response to determining to respond to the node register command, the assigned time slot delay being one of the plurality of time slot delays, the message being a response to the node register command.

These and other embodiments of the present invention will also become readily apparent to those skilled in the art from the following detailed description of the embodiments having reference to the attached figures, thee invention not being limited to any particular embodiment(s) disclosed.

BRIEF DESCRIPTION OF THE DRAWINGS

The following drawings incorporated in and forming a part of the specification illustrate, and together with the detailed description serve to explain the various aspects of the implementation(s) and/or embodiments of the invention and not of the invention itself.

DETAILED DESCRIPTION

Figure 1:
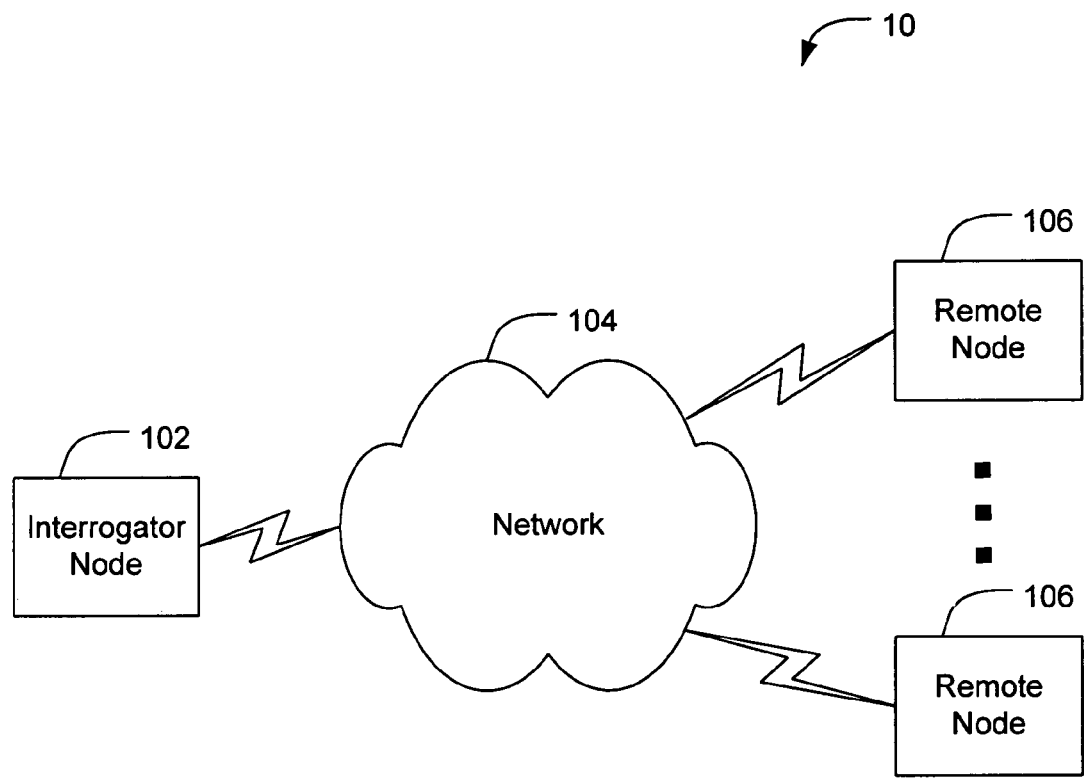
FIG. 1 is a diagram illustrating an exemplary environment in which a system of the present invention may operate.

Munitions, such as, by way of example, missile systems, are stored most of their lives. While stored, the munitions remain dormant and their condition is not readily known. Furthermore, while stored, the munitions may become inoperable for one or more reasons, such as, by way of example, humidity, temperature, vibration, low power, component failure, and the like. When a particular piece of munitions is needed, the munitions may be "down" and not operable for one or more reasons. Therefore, the condition of the munitions need to be periodically and repeatedly ascertained in order to ensure the readiness of the munitions.

Munitions are typically stored by the thousands without adequate location or identification information. To determine the diagnostic condition of the munitions, an individual typically mounts a computer, such as a laptop computer, next to each piece of stored munitions, and executes one or more programs which communicate with the munitions to determine the munitions' health (i.e., diagnostic condition). Thus, it is extremely time consuming to obtain the health of thousands of stored munitions in this manner.

Certain types of munitions are also very sensitive to changes in its surrounding energy levels. For example, missiles are very volatile and their warheads may be set off by excessive transmissions made by surrounding communication devices (e.g., RF transmitters), which result in an energy increase in the RF field.

The registration system and corresponding methods of the present invention create a networked environment that facilitates communication between a control or interrogator node and one or more remote nodes. The interrogator node, which is analogous to the aforementioned laptop computer, can be carried to a location proximate to where the munitions are stored. Each remote node can be coupled to one or more pieces of munitions and can function to communicate with, and provide one or more items of diagnostic data to the interrogator node.

When carried to a location proximate to where the munitions are stored, the interrogator node can be instructed or prompted to communicate with the remote nodes utilizing a communication medium conforming to, by way of example, one or more wireless communication protocols. Utilizing the communication medium, the interrogator node can register the remote nodes to create a network environment.

In one embodiment, during registration, the interrogator node determines the identity and/or identification information necessary to identify and communicate with a particular remote node. Moreover, during the registration of the remote nodes, at most one remote node is transmitting at any instance in time, thus, reducing interference and RF noise that typically result from collisions caused by multiple nodes communicating at substantially the same time. Once one or more remote nodes are registered into the network environment, the interrogator node can request and obtain one or more items of diagnostic information from the registered remote nodes.

The various embodiments of the present invention and their advantages are best understood by referring to 1 through 16 of the drawings. The elements of the drawings are not necessarily to scale, emphasis instead being placed upon clearly illustrating the principles of the invention. Throughout the drawings, like numerals are used for like and corresponding parts of the various drawings.

The drawings represent and illustrate examples of the various embodiments of the invention, and not a limitation thereof. It will be apparent to those skilled in the art that various modifications and variations can be made in the present invention without departing from the scope and spirit of the invention as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present invention covers such modifications as come within the scope of the present features and their equivalents.

Furthermore, reference in the specification to "an embodiment," "one embodiment," or "various embodiments" means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Even though the embodiments of the registration system and corresponding methods are described with reference to munitions systems, those of ordinary skill in the art will appreciate that the registration system may be readily applied to other environments where a network participant desires to communicate with one or more other network participants whose identity is not known beforehand. Furthermore, it will also be apparent to those skilled in the art that the registration process of the present invention is suitable for various types of networks, including both wired, wireless, and any combination thereof, and various types of applications other than diagnostic applications.

Turning first to the nomenclature of the specification, the detailed description that follows is presented largely in terms of processes and symbolic representations of operations performed by conventional and/or application specific computers, including computer components. A computer may be any microcontroller, microprocessor or processor (hereinafter referred to as processor) controlled device such as, by way of example, personal computers, workstations, servers, clients, mini-computers, main-frame computers, laptop computers, a network of one or more computers, mobile computers, portable computers, handheld computers, palm top computers, set top boxes for a TV, interactive televisions, interactive kiosks, personal digital assistants, interactive wireless devices, mobile browsers, or any combination thereof. The computer may possess input devices such as, by way of example, a keyboard, a keypad, a mouse, a microphone, or a touch screen, and output devices such as a computer screen, printer, or a speaker. Additionally, the computer includes memory such as a memory storage device or an addressable storage medium.

The computer may be a uniprocessor or multiprocessor machine. Additionally the computer, and the computer memory, may advantageously contain program logic or other substrate configuration representing data and instructions, which cause the computer to operate in a specific and pre-defined manner as, described herein. The program logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The program logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art to effectively convey teachings and discoveries to others skilled in the art.

The program logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

The program logic can be maintained or stored on a computer-readable storage medium. The term "computer-readable storage medium" refers to any medium that participates in providing the symbolic representations of operations to a processor for execution. Such media may take many forms, including, without limitation, volatile memory, nonvolatile memory, electronic transmission media, and the like. Volatile memory includes, for example, dynamic memory and cache memory normally present in computers. Nonvolatile memory includes, for example, optical or magnetic disks.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as, by way of example, read-only memory (ROM).

Referring now to the drawings, FIG. 1 is a diagram illustrating an exemplary environment 10 in which a system of the present invention may operate. As depicted, system 10 includes an interrogator node 102 coupled to one or more remote nodes 106. In particular, interrogator node 102 and remote nodes 106 are coupled through a network 104. As used herein, the terms "connected," "coupled," or any variant thereof, means any connection or coupling, either direct or indirect, between two or more elements; the coupling or connection between the elements can be physical, logical, or a combination thereof.

Interrogator node 102 generally functions to request and facilitate the registration of one or more remote nodes 106. Interrogator node 102 includes program logic to initiate and enable communication with and registration of one or more remote nodes 106. Interrogator node 102 can also include program logic to request and obtain diagnostic information from one or more registered remote nodes 106.

In one embodiment, interrogator node 102 may be a handheld computing device, such as, by way of example, a personal digital assistant (PDA), a portable computing device, and the like. Interrogator node 102 may provide an interface through which a user can initiate the registration process. Once initiated, interrogator node 102 can transmit, for example, a broadcast message (i.e., a registration command), which requests registration from one or more remote nodes 106 capable of receiving the transmitted broadcast message. Interrogator node 102 then listens for and receives responses to the registration command transmitted by one or more responding remote nodes 106 and proceeds to register the responding remote nodes 106 as described herein. In other embodiments, interrogator node 102 may be other computing devices, such as, by way of example, laptop computers, servers, desktop computers, and the like, capable of and suitable for performing the registration process as described herein. Interrogator node 102 and the registration process are further described below.

Remote node 106 generally functions to respond to received messages, including registration commands transmitted by interrogator node 102, monitor a coupled munitions system, and provide any requested diagnostic information regarding its corresponding munitions system. Remote node 106 includes program logic to detect and/or receive registration commands transmitted by interrogator node 102 and to register with interrogator node 102. Remote node 106 may also include program logic to obtain and provide diagnostic information regarding one or more munitions systems.

In one embodiment, remote node 106 may be a control device that is coupled to a munitions system. Remote node 106 can periodically monitor the munitions system to ascertain the diagnostic condition and health of the coupled munitions system. Remote node 106 may additionally receive registration command messages and participate in the corresponding registration process as described herein. In other embodiments, remote node 106 can be coupled to and monitor more than one munitions system. Remote node 106 is further described below.

Network 104 generally provides a communications medium suitable for facilitating communication between coupled devices such as interrogator node 102 and remote nodes 106. Network 104 allows interrogator node 102 and remote nodes 106 to communicate with each other during the registration process as described herein.

In one embodiment, network 104 may include a communications system that supports a variety of communications, such as, by way of example, a radio frequency (RF), specialized mobile radio (SMR), analog cellular, digital cellular, optical, personal communication system (PCS), Cellular Digital Packet Data (CDPD), RAM mobile data, Enhanced Specialized Mobile Radio (ESMR), infrared (e.g., IRDA), and the like. Network 104 may support and utilize one or more communications protocols such as, by way of example, Bluetooth, Inband, Integrated Services Digital Network (ISDN), Signaling System 7 (SS7), Enhanced Throughput Cellular (ETC), Enhanced Cellular Control (EC2), Mobile Data Link Protocol, various optical network protocols, and the like.

In other embodiments, network 104 may support a wired communication medium and protocol. For example, network 104 may include a local area network (LAN) configured in one or more of various configurations or topologies, such as, by way of example, Ethernet, token ring, wheel and spoke, and the like. Network 104 may also support the Internet and the World Wide Web. In still other embodiments, network 104 may support any combination of the aforementioned wireless and wired communications and corresponding communication protocols.

Figure 2:
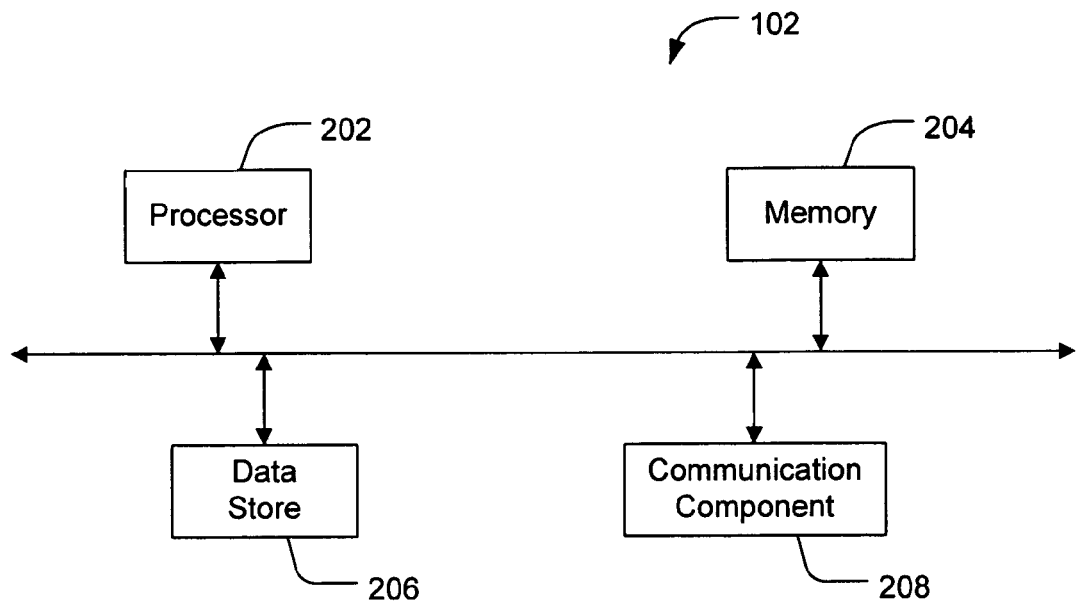
FIG. 2 illustrates selected components of an interrogator node, according to one embodiment of the present invention.

FIG. 2 illustrates selected components of interrogator node 102, according to one embodiment of the present invention.

As depicted, interrogator node 102 includes a processor 202, a memory 204, a data store 206, and a communication component 208. Processor 202 generally functions to control the operation of one or more components of interrogator node 102. For example, processor 202 executes the program logic designed to facilitate the registration of remote nodes 106 as disclosed herein.

Memory 204 is coupled to processor 202 and includes computer readable storage medium. Memory 204 generally functions to maintain and provide program logic, including units of information and data, to processor 202 for execution. For example, processor 202 accesses the information and data, including the program logic, stored in memory 204 to perform the registration process.

Data store 206 is coupled to processor 202 and memory 204. Data store 206 generally functions to store registration data and information. Data store 206 can also store the program logic that is executed by processor 202. Communication component 208 is coupled to processor 202, memory 204, and data store 206. Communication component 208 generally functions to provide communication with remote nodes 106 over network 104. Among other functions, communication component 208 may transmit and receive messages over network 104.

Figure 3:
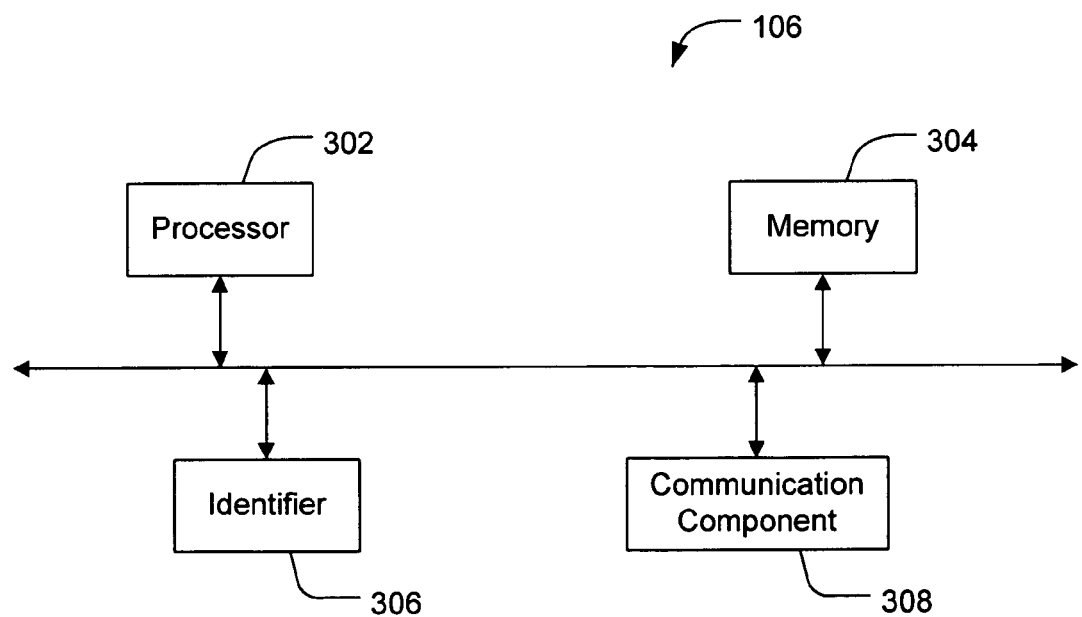
FIG. 3 illustrates selected components of a remote node, according to one embodiment of the present invention.

FIG. 3 illustrates selected components of remote node 106, according to one embodiment of the present invention. As depicted, remote node 106 includes processor 302, memory 304, identifier 306, and communication component 308. Processor 302 generally functions to control the operation of remote node 106. For example, processor 302 executes program logic to participate in the registration process as disclosed herein. Processor 302 may also execute program logic to obtain the diagnostic health and condition of one or more munitions systems and accordingly provide the diagnostic information to interrogator node 102.

Memory 304 is coupled to processor 302 and includes computer readable storage medium. Memory 304 generally functions to maintain and provide program logic, including units of information and data, to processor 302 for execution. For example, processor 302 accesses the information and data, including the program logic, stored in memory 304 to participate in the registration of remote node 106.

Figure 4:
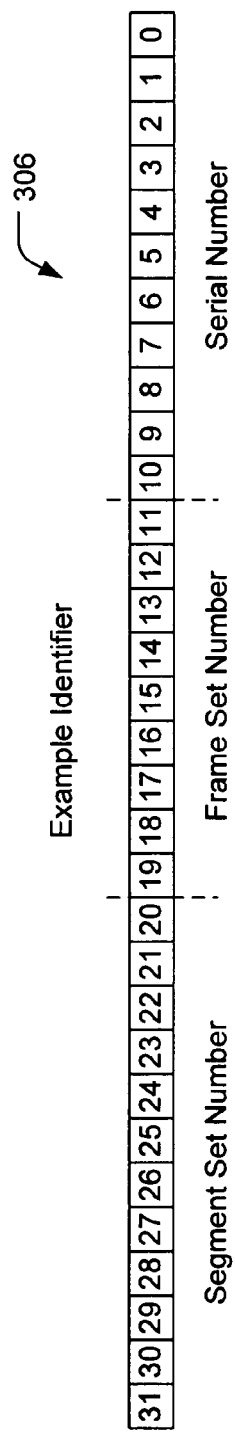
FIG. 4 illustrates an exemplary identifier, according to one embodiment of the present invention.

Identifier 306 is coupled to processor 302 and memory 304, and generally functions to uniquely identify its associated or coupled remote node 106. FIG. 4 illustrates an exemplary identifier 306, according to one embodiment of the present invention. Generally, identifier 306 is composed of a sequence of bits that uniquely identifies the corresponding remote node 106. The plurality of bits may be assembled or grouped into one or more sets, where each set is composed of one or more bits.

As depicted in FIG. 4, by way of example, identifier 306 is composed of thirty two (32) bits (bit number 0 is the least significant bit and bit number 31 is the most significant bit) comprising a segment set number, a frame set number, and a serial number. As depicted, bits 31 to 20 comprise the segment set number, bits 19 to 11 comprise the frame set number, and bits 10 to 0 comprise the serial number. The segment set number, frame set number, and serial number work in conjunction to uniquely identify remote node 106.

A technical advantage to grouping the plurality of bits that make up identifier 306 for a particular remote node 106 into one or more sets is that this allows remote node 106 to belong to and be identified as a member of the one or more sets. Continuing the above example, 32 bits in identifier 306 facilitates the identification of 4,294,967,296 ($2^{32}$) unique remote nodes 106 capable of participating in a communication network and, thus, a registration process as disclosed herein. The 4,294,967,296 remote nodes 106 may be thought of as the "Universe Set."

In the example and as depicted in FIG. 4, the Universe Set is divided into 4096 ($2^{12}$) "Segment Sets" that can each contain up to 1,048,576 ($2^{20}$) remote nodes 106. Each Segment Set is divided into 512 ($2^9$) subsets or "Frame Sets" that can each contain up to 2,048 ($2^{11}$) remote nodes 106. Grouping the bits in this manner facilitates the identification of each remote node 106 by making it a member of a specific Frame Set that is a member of a specific Segment Set that is in turn a member of a specific Universe Set.

By way of example, in the case of munitions systems, the Universe Set can be the set of all munitions. The Universe Set of munitions can then be categorized according to storage location, where a Segment Set identifies a specific storage location. The munitions at each storage location can then be categorized according to type of munitions, where a Frame Set identifies a specific munitions type. Each item of munitions of a particular type (as identified by a frame set number) and stored at a particular location (as identified by a segment set number) can be further identified by a unique serial number. Thus, an item of munitions can be categorized according to one or more factors that describe the item of munitions, and this information can be maintained in the munitions' identifier.

In the following description, for purposes and ease of explanation, the deterministic registration process will further be explained in the context of utilizing identifier 306 to identify remote node 106: However, it will be appreciated that identifier 306 need not be limited in the manner discussed above, and the deterministic registration process maybe practiced with an identifier that is composed of a plurality of bits that are not grouped into sets and subsets. By way of example and not limitation, an identifier suitable for use in the deterministic registration process may be composed of a different number of bits, contain a different number of sets (including no sets), contain a different number of bits in each set, etc. Furthermore, the use of the names "Universe Set," "Segment Set" and "Frame Set" are arbitrary and only for ease of explanation. Thus, the deterministic registration process is not intended or meant to be limited to the described exemplary process and the use of the aforementioned identifier 306.

For example, in another embodiment, identifier 306 can be implemented as an index into a database of unique identifiers (e.g., unique addresses, serial numbers, etc.), which can be used to uniquely identify remote node 106. In this instance, identifier 306 can reference a database location containing a unique identifier for remote node 106. The database can be maintained on interrogator node 102 or other suitable computing or storage device. In other embodiments, identifier 306 can reference a database location that contains other information regarding remote node 106, such as, by way of example, information and data pertaining to the munitions system or other apparatus coupled to remote node 106.

Referring again to FIG. 3, communication component 308 is coupled to processor 302, memory 304, and identifier 306. Communication component 308 generally functions to provide communication with interrogator node 102 over network 104. Communication component 308 may also provide communication with other devices coupled to and/or accessible over network 104, such as, by way of example, other remote nodes 106. Among other functions, communications component 308 may transmit and receive messages over network 104. In another embodiment, communication component 308 may also provide communication with one or more munitions systems, thus, enabling remote node 106 to obtain diagnostic information regarding the one or more munitions systems.

One of ordinary skill in the art will appreciate that the depicted components and modules are only exemplary and that the functionality provided for in the components, modules, and databases may be combined into fewer components, modules, or databases or further separated into additional components, modules, or databases. In some embodiments, one or more of the functions provided by the modules, components, and databases may be optional and not implemented or present.

Figure 5:
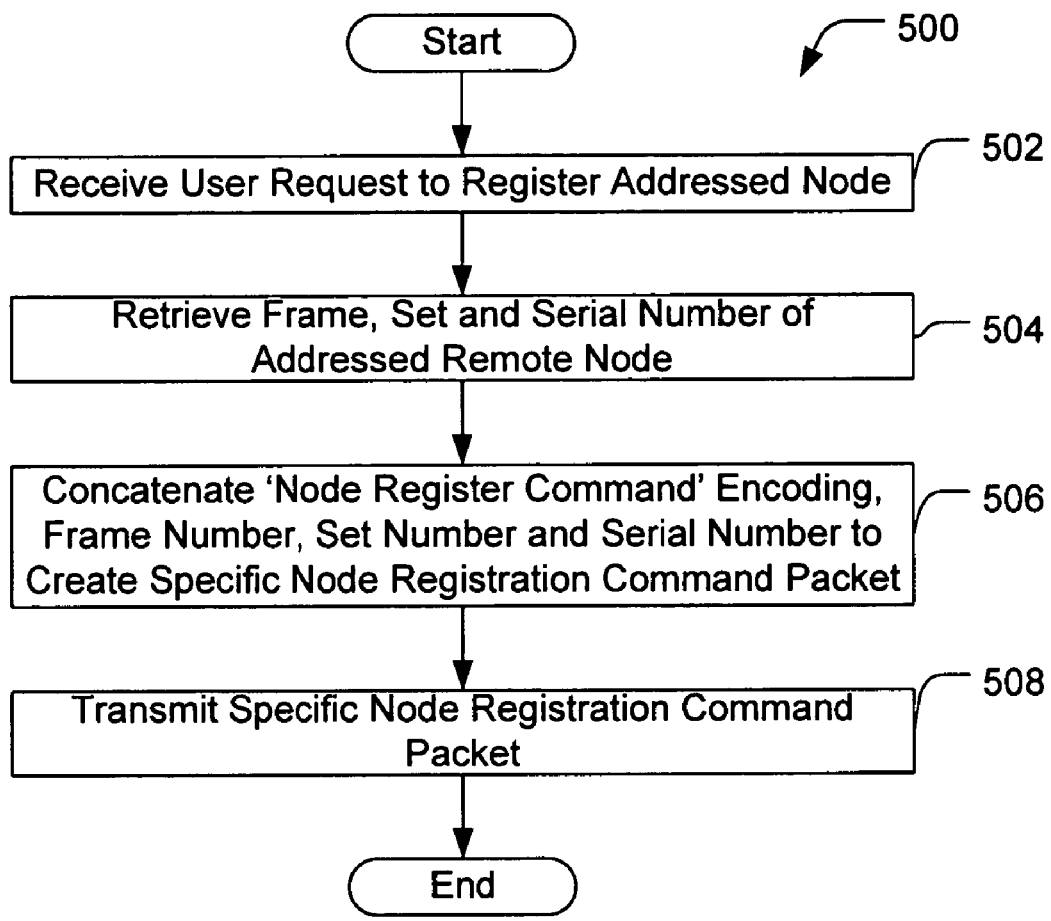
FIG. 5 illustrates a flow chart of one embodiment of a method by which an interrogator node initiates registration of a specific remote node, according to the present invention.

FIG. 5 illustrates a flow chart of one embodiment of a method 500 by which interrogator node 102 initiates registration of a specific remote node 106, according to the present invention. In particular, method 500 outlines a process by which interrogator node 102 requests and registers an addressed remote node 106. During method 500, interrogator node 102 and the addressed remote node 106 interact to perform a registration of the addressed remote node 106 with interrogator node 102, which enables interrogator node 102 to subsequently communicate with the registered remote node 106.

By way of example, a user (e.g., person) may want to discern the current condition of a particular stored munitions system. The munitions system may be stored in a suitable munitions storage area and may be coupled to a status communication device, such as remote node 106 described herein. Remote node 106 is operable to communicate and interact with a host device, such as interrogator node 102 described herein, to report the condition or status of the coupled munitions system.

The user wanting to obtain information regarding the condition of the stored munitions systems can transport the host device to the proximate location of the stored munitions systems. The host device needs to be sufficiently close to the status communication devices to enable proper communication and interaction between the devices. One of ordinary skill will appreciate that the proximity of the devices is dependent on, among other factors, the utilized communication medium and protocol.

Although the example and description describes steps being performed by a human user (i.e., user wanting to discern the current condition of a stored munitions system) interacting with, for example, the host device, it should be understood that some or all of the steps and/or actions of the user can be performed automatically by the host device. For example, a host device coupled to a network may be programmed to interrogate the network to identify and register the network participants as disclosed herein.

Referring again to method 500, beginning at a start step, the user can transport interrogator node 102 to the storage area and initiate a registration process, for example, by powering on interrogator node 102 and inputting a predetermined command and necessary data to request a specific remote node 106 to register with interrogator node 102. At step 502, interrogator node 102 receives the user request to register an addressed remote node 106. For example, this information may be received via one or more user interfaces (i.e., application windows, menus, commands, etc.) executed on interrogator node 102.

At step 504, interrogator node 102 retrieves the user-specified segment set number, frame set number and serial number of the addressed remote node 106. For example, the user may provide the address information (i.e., segment set number, frame set number and serial number) contemporaneously with the request to register remote node 106, and the address information identifies the desired remote node 106. Generally, the manufacturer of remote node 106 stores a unique serial number in each remote node 106 it manufacturers. The serial number is a number (i.e., sequence of ones and zeros) that typically is not all zeros, and that uniquely identifies remote node 106.

At step 506, interrogator node 102 creates a specific node registration command packet by, for example, concatenating an encoding for a "node register command," the segment set number, the frame set number and the serial number. The specific node registration command packet is a message (i.e., bit sequence) that interrogator node 102 and remote nodes 106 recognize and understand to be a command for the addressed remote node 106 to register with interrogator node 102.

Figure 6:
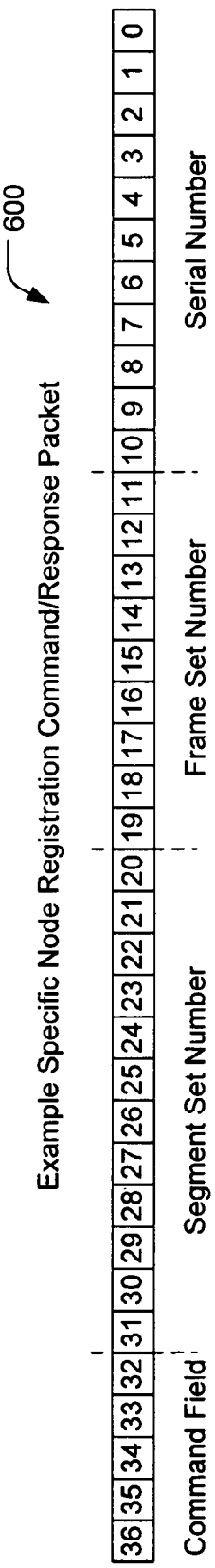
FIG. 6 illustrates one embodiment of a specific node registration command/response packet, according to the present invention.

FIG. 6 illustrates one embodiment of a specific node registration command/response packet 600, according to the present invention. The specific node registration command/response packet is, depending on the command field contents, either a command for an addressed remote node 106 to register with interrogator node 102 or a response from the addressed remote node 106 to register with interrogator node 102. As depicted, packet 600 is a bit sequence of zeros and ones.

By way of example, packet 600 is composed of thirty-seven (37) bits (bits 0 to bit 36, where bit 0 is the least significant bit and bit 36 is the most significant bit) comprising a command field in bits 36 to 32, followed by the 32 bits that comprise identifier 306 (see FIG. 4). In particular, a five (5) bit binary encoding corresponding to the node register command is placed in the command field (bits 36 to 32), a binary representation of the segment set number is placed in the next twelve bits (bits 31 to 20), a binary representation of the frame set number is placed in the next nine bits (bits 19 to 11), and a binary representation of the serial number is placed in the next eleven bits (bits 10 to 0) of packet 600.

For example, assuming that the binary sequence '00011' is the encoding for a node register command, the user may have previously specified 4, 12 and 3 as the segment set, frame set and serial numbers, respectively, of remote node 106 that is to register with interrogator node 102. In this instance, packet 600 will contain the following bit sequence: '0001100000000100000000110000000000011'. It will be appreciated that the length of the command field (i.e., the number of bits necessary to encode the command) in packet 600 may be of varying lengths, and is dependent on factors, such as the number of commands that need to be encoded. Moreover, the ordering of the fields may be different in certain embodiments. For example, the command encoding may appear at a different location in packet 600.

Referring again to method 500, at step 508, interrogator node 102 transmits the specific node registration command packet. For example, interrogator node 102 transmits the just created packet 600, which identifies the addressed remote node 106 over network 104 for receipt by the one or more remote nodes 106 that are coupled to network 104. Subsequent to transmitting the specific node registration command packet, interrogator node 102 resumes processing, for example, command/response communications and various other functions.

Those of ordinary skill in the art will appreciate that, for this and other methods disclosed herein, the functions performed in the exemplary flow charts may be implemented in differing order. Furthermore, steps outlined in the flow charts are only exemplary, and some of the steps may be optional, combined into fewer steps, or expanded into additional steps without detracting from the essence of the invention.

Figure 7:
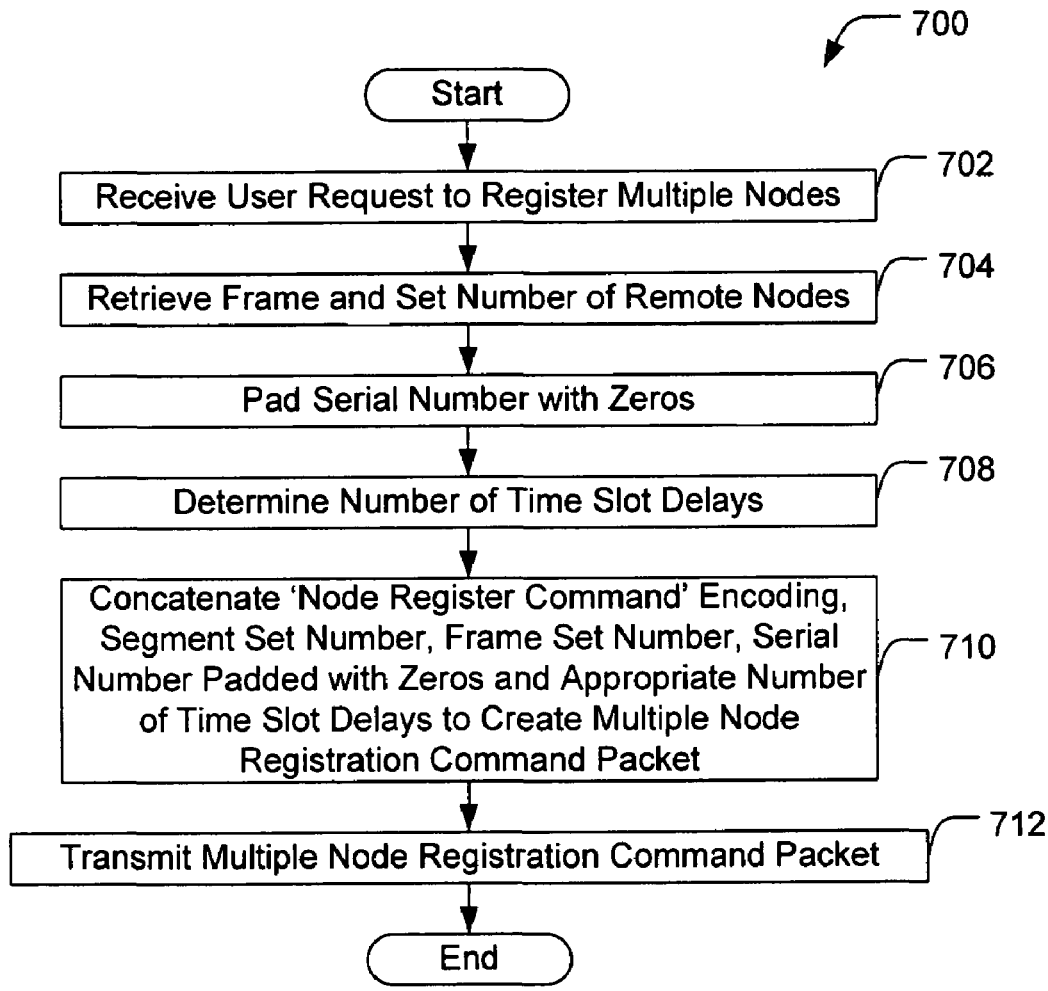
FIG. 7 illustrates a flow chart of one embodiment of a method by which an interrogator node initiates registration of one or more remote nodes, according to the present invention.

FIG. 7 illustrates a flow chart of one embodiment of a method 700 by which interrogator node 102 initiates registration of one or more remote nodes 106, according to the present invention. In particular, method 700 outlines a process by which interrogator node 102 specifies a range of remote nodes 106 that are to register with interrogator node 102. The range of remote nodes 106 is determined by the addressed segment set and frame set, which may be provided by a user. During method 700, interrogator node 102 and remote nodes 106 that are in the addressed segment set and frame set interact to perform a registration of remote nodes 106 in the specified range with interrogator node 102, which enables interrogator node 102 to subsequently communicate with the registered remote nodes 106.

Continuing the above munitions system example, the user (e.g., person) may want to discern the current condition of the stored munitions systems that belong to a particular segment set and frame set, but, may not know the serial numbers of each remote node 106 in the desired segment and frame sets. Alternatively, the user may know the serial numbers of each remote node 106 in the desired segment and frame sets, but, may not want to request registration from and register each remote node 106 in an iterative manner (i.e., using method 500 above). For example, there may be a large number of remote nodes 106 in the desired segment and frame sets, and registering each remote node 106 one at a time may be too time consuming.

Referring again to method 700, beginning at a start step, the user can transport interrogator node 102 to the storage area and initiate a registration process, for example, by powering on interrogator node 102 and inputting a predetermined command and necessary data to request the one or more remote nodes 106 belonging to a particular segment set and frame set to register with interrogator node 102. At step 702, interrogator node 102 receives the user request to register the multiple remote nodes 106 that belong to an addressed segment set and frame set.

At step 704, interrogator node 102 retrieves the user-specified segment set number and frame set number. For example, the user may provide the desired segment set and frame set numbers contemporaneously with the request to register remote nodes 106 that belong to the specified segment set and frame set.

At step 706, interrogator node 102 pads the serial number with zeros. In one embodiment, the serial number padded with zeros (i.e., serial number being all zeros) is an indication that all remotes nodes 106 that receive this register command and that are in the segment set and frame set specified in the register command, should respond to register command irrespective of its serial number. It is appreciated that a bit sequence other than all zeros, for example, a reserved or an unused bit sequence, may be used to indicate that all remote nodes 106 in the addressed range should respond to the register command.

At step 708, interrogator node 102 determines a number of time slot delays that is necessary to receive the response messages from the responding remote nodes 106. In one embodiment, each time slot delay is a response period (i.e., time slot) in which a responding (i.e., registering) remote node 106 (i.e., a remote node 106 that belongs to the addressed segment set and frame set) is to transmit a message (i.e., a response to the multiple node registration command) to indicate its presence and desire to register with interrogator node 102. Moreover, each time slot delay is a time period during which interrogator node 102 receives the transmission of the message from a corresponding remote node 106.

The number of time slots depends on the number of remote nodes 106 that can belong to a particular segment set and frame set. Stated another way, the number of time slots is dependent on the potential number of different serial numbers that can belong to a particular segment set and frame set (i.e., the length of or number of bits in the serial number field in identifier 306). For example, assuming that the serial number is composed of eleven (11) bits, the number of time slots is 2,048.

Figure 8:
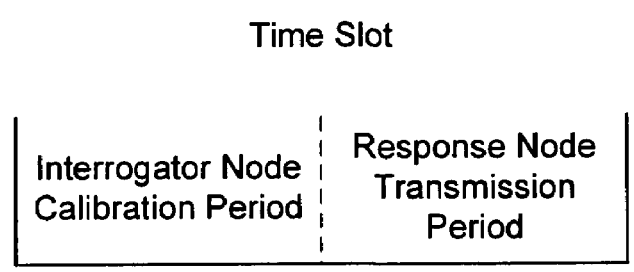
FIG. 8 is an exemplary illustration of a time slot delay, according to one embodiment of the present invention.

Each time slot delay represents a length or duration of time that is sufficient for interrogator node 102 to calibrate its communication component 208 and receive a message that indicates the desire of a corresponding remote node 106 to register with interrogator node 102. FIG. 8 is an exemplary illustration of a time slot delay, according to one embodiment of the present invention. As illustrated, the first portion of each time slot delay (i.e., response period) is dedicated to interrogator node 102 calibration to ambient noise in network 104. During the first portion of the time slot delay, interrogator node 102 calibrates its communication component 208 to the ambient noise present in network 104. For example, the noise will be ambient RF noise in the case of RF networks.

The second portion (i.e., the remainder) of the time slot delay is dedicated to a responding remote node 106 response message. In one embodiment, each remote node 106 in an addressed segment set and frame set selects its assigned time slot or response period, and during the selected time slot, transmits a message (i.e., a predetermined signal or sequence of signals, a sequence of one or more bits, etc.) to interrogator node 102 to register with interrogator node 102 (i.e., the message is a response to the multiple node registration command). Interrogator node 102 calibration to ambient noise and remote node 106 selection of its assigned time slot is further discussed below.

It will be appreciated that the duration of a time slot (i.e., length of time for a time slot delay) is determined by factors such as, by way of example and not limitation, type of communication network utilized, rate of transmission on the utilized communication network, distance a signal needs to travel, etc. In one experimental embodiment, a time slot delay of 26 μsec. was a sufficient response period to enable interrogator node 102 to calibrate for ambient RF noise and receive a response to the registration command from responding remote nodes 106.

Referring again to method 700, at step 710, interrogator node 102 creates a multiple node registration command packet by, for example, concatenating an encoding for a "node register command," the segment set number, the frame set number, serial number, and the appropriate number of time slot delays. The serial number was previously padded with the requisite number of zeros (step 706), and the appropriate number of time slot delays was calculated based on the number of remote nodes 106 that can potentially respond (step 708). The multiple node registration command packet is a message that interrogator node 102 and remote nodes 106 recognize and understand to be a command for remote nodes 106 that belong to the addressed segment set and frame set to register with interrogator node 102.

Figure 9:
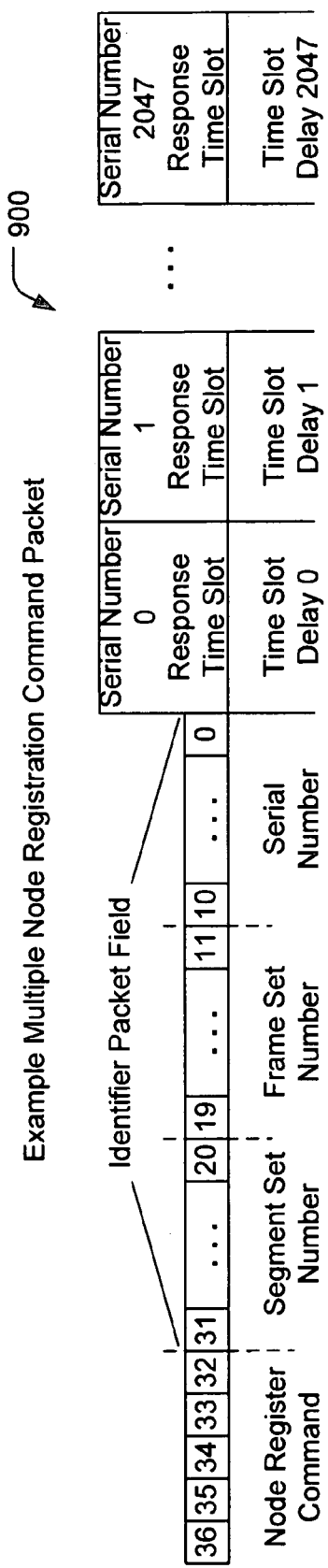
FIG. 9 illustrates an exemplary multiple node registration command packet, according to one embodiment of the present invention.

FIG. 9 illustrates an exemplary multiple node registration command packet 900, according to one embodiment of the present invention. As depicted, packet 900 is a bit sequence of zeros and ones followed by an appropriate number of time slot delays. By way of example, packet 900 is composed of thirty-seven (37) bits followed by 2,048 time slot delays. Generally, except for bit 0 to bit 10 (the serial number padded with zeros), the first thirty-seven bits of packet 900 are identical in format to the thirty-seven bits comprising packet 500.

In particular, in addition to the zeros placed in bits 0 to 10, the five bit binary encoding corresponding to the node register command is placed in the command field (bits 36 to 32), a binary representation of the segment set number is placed in the next twelve bits (bits 31 to 20), and a binary representation of the frame set number is placed in the next nine bits (bits 19 to 11) of packet 900.

For example, assuming that the binary sequence '00011' is the encoding for a node register command, the user may have previously requested registration of all remote nodes 106 belonging to segment set 9 and frame set 13. In this instance, packet 900 will contain the following bit sequence: '000110000000010010000011010000000000', followed by 2,048 time slot delays. Each of the 2,048 potential remote nodes 106 that can belong to the addressed segment set and frame set is assigned to a corresponding time slot delay in which to respond to the multiple node registration command.

In one embodiment, the first time slot delay (i.e., time slot delay 0) is assigned to remote node 106 having identifier 306 composed of the addressed segment set and frame set numbers and serial number 0, the second time slot delay (i.e. time slot delay 1) is assigned to remote node 106 having identifier 306 composed of the addressed segment set and frame set numbers and serial number 1, and so on up to the $2,048^{th}$ time slot delay. An appropriate remote node 106 wanting to register with interrogator node 102 in response to receiving the multiple node registration command packet waits for its appropriate time slot (i.e., based on its serial number) and transmits a message to indicate its intention to register with interrogator node 102.

Referring again to method 700, at step 712, interrogator node 102 transmits the multiple node registration command packet. For example, interrogator node 102 transmits the just created packet 900, which contains the addressed segment set and frame set numbers, padded zeros for the serial number and the requisite number of time slot delays over network 104 for receipt by the one or more remote nodes 106 that are coupled to network 104.

It is appreciated that the time slot delays are not actually transmitted like the sequence of one and zeros over network 104, but, is a duration of time that is reserved for transmission of messages by remote nodes 106 in response to the multiple node registration command packet, and the receipt of the transmitted messages by interrogator node 102. Therefore, subsequent to transmitting the node register command, the segment set number, the frame set number, and zero-padded serial number portion of the multiple node registration command packet, interrogator node 102 processes the registration command responses transmitted by responding remote nodes 106 during the response periods corresponding to the number of time slot delays.

Figure 10:
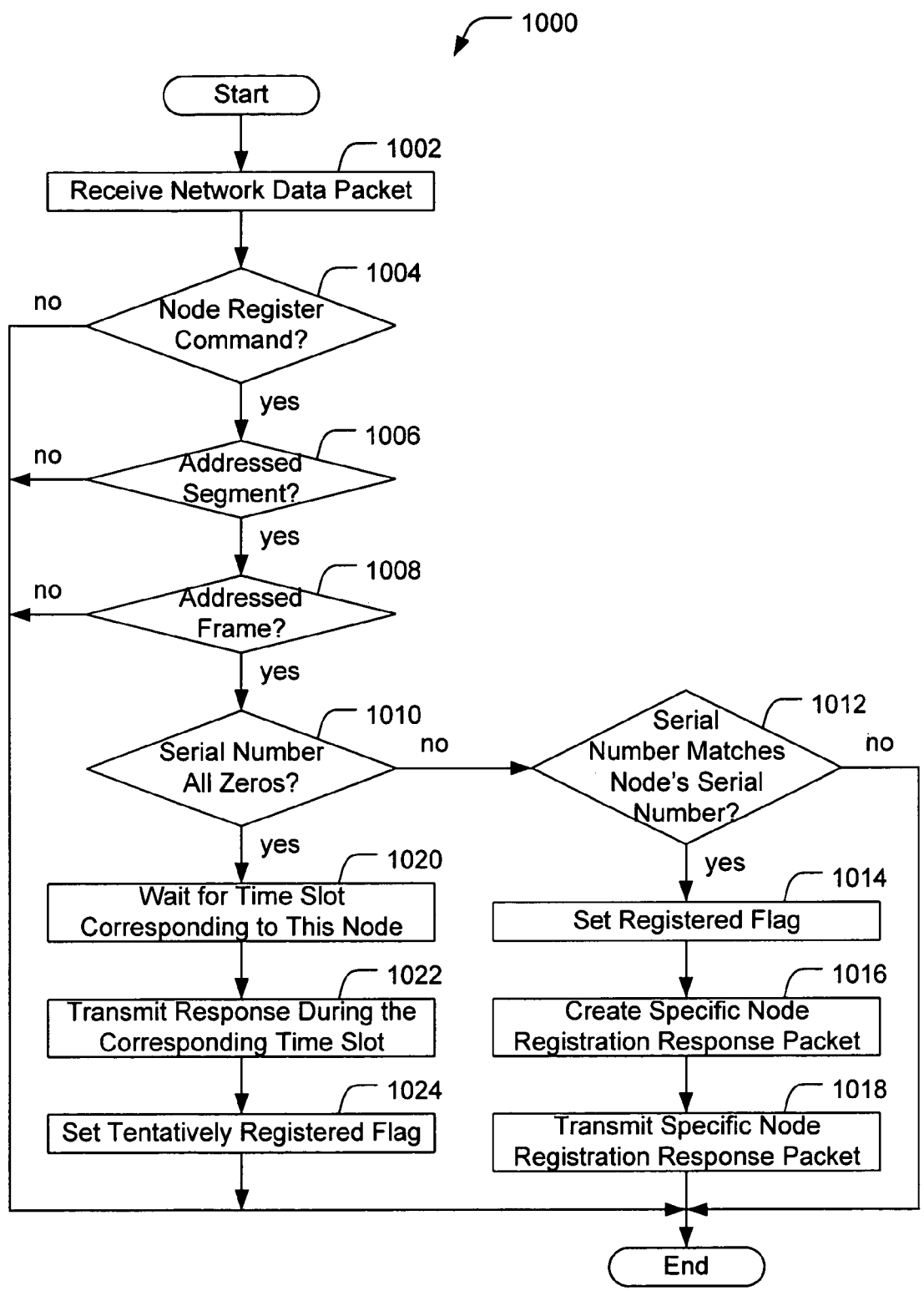
FIG. 10 illustrates a flow chart of one embodiment of a method by which a remote node processes a registration command, according to the present invention.

FIG. 10 illustrates a flow chart of one embodiment of a method 1000 by which remote node 106 processes a registration command, according to the present invention. Remote nodes 106 continuously monitor communication component 308 for the receipt of messages, including the registration command packets, received via network 104. Beginning at a start step, remote node 106 listens for and receives a network message (i.e., network data packet) at step 1002.

At step 1004, remote node 106 determines if the received network data packet is a node register command. For example, remote node 106 determines from the command encoding in the received network data packet to determine if it is either a specific node registration command packet or a multiple node registration command packet. If remote node 106 determines that the received network data packet is not a node register command, then remote node 106 resumes processing, for example, processing the received network data packet, command/response communications and various other functions.

If, at step 1004, remote node 106 determines that the received network data packet is a node register command, then, at step 1006, remote node 106 determines if it is in the addressed segment. The addressed segment is specified by the segment set number received as part of the node register command, and the segment set number of remote node 106 is contained in its identifier 306. If remote node 106 determines that its segment set number does not match the segment set number received as part of the node register command, then remote node 106 is not in the addressed segment and remote node 106 resumes processing, for example, command/response communications and various other functions.

If, at step 1006, remote node 106 determines that it is in the addressed segment, then, at step 1008, remote node 106 determines if it is in the addressed frame. The addressed frame is specified by the frame set number received as part of the node register command, and the frame set number of remote node 106 is contained in its identifier 306. If remote node 106 determines that its frame set number does not match the frame set number received as part of the node register command, then remote node 106 is not in the addressed frame and remote node 106 resumes processing, for example, command/response communications and various other functions.

If, at step 1008, remote node 106 determines that it is in the addressed frame, then, at step 1010, remote node 106 determines if the serial number received as part of the node register command is padded with zeros (i.e., the serial number received is all zeros). If the serial number received as part of the node register command is not all zeros, this indicates that the node register command is a command for a addressed remote node 106 to register with interrogator node 102 (i.e., that the received network data packet is a specific node registration command packet).

If remote node 106 determines that the serial number received as part of the node register command is not all zeros, then, at step 1012, remote node106 determines whether its serial number, as specified in its identifier 306, matches the serial number received as part of the node register command. If remote node 106 determines that the received serial number matches its serial number, then remote node 106 knows that it is the addressed remote node 106. At step 1014, remote node 106 sets a registered flag to indicate its current status as registered with interrogator node 102. The registered flag may be maintained in memory 304.

At step 1016, remote node 106 creates a specific node registration response packet. The specific node registration response packet is a message that is sent by a responding remote node 106 to interrogator node 102, and indicates that the transmitting remote node 106 wishes to register with interrogator node 102 in response to the receipt of a specific node registration command packet.

Packet 600 is a suitable specific node registration response packet, according to the present invention. To indicate that packet 600 is a registration response transmitted by a specific remote node 106, the command field contains an encoding that corresponds to a "node register response." The segment set number, frame set number and serial number contains the segment set, frame set and serial number, respectively, of remote node 106 that is responding to the specific node registration command.

At step 1018, remote node 106 transmits the specific node registration response packet. For example, remote node 106 transmits the just created packet 600, which contains its segment set number, frame set number and serial number, over network 104 for receipt by interrogator node 102. Subsequent to transmitting the specific node registration response packet, remote node 106 resumes processing, for example, command/response communications and various other functions.

Alternatively, if, at step 1012, remote node 106 determines that the received serial number does not match its serial number, then remote node 106 knows that it is not the addressed remote node 106 and that the received node register command was a command specifically directed to another remote node 106. In this instance, remote node 106 whose serial number does not match the received serial number resumes processing, for example, command/response communications and various other functions.

Alternatively, if, at step 1010, remote node 106 determines that the serial number received as part of the node register command is all zeros, this indicates that the node register command is a command for remote nodes 106 in the addressed range, as determined from the specified segment set and frame set numbers, to register with interrogator node 102. In this instance, because remote node 106 determined that it is in the addressed segment (step 1006) and addressed frame (step 1008), remote node 106 knows that it is in the addressed range and that it should respond to the node register command.

At step 1020, remote node 106 waits for the its appropriate time slot. As previously discussed, the time slots can be considered a part of the node register command in that, the time slots follow bit 0 of the multiple node registration command packet. The appropriate time slot is determined by the serial number of remote node 106. It is appreciated that the duration of each time slot is predetermined and remote node 106 knows the duration of each time slot and, thus, knows how to determine its time slot. Stated another way, remote node 106 knows the duration of time to wait before transmitting and, moreover, knows the duration of time to transmit before stopping its transmission.

At step 1022, remote node 106 transmits a response during its corresponding time slot. In one embodiment, the transmitted response is a signal that represents 'true' or '1'. Remote node 106 transmits this signal for the duration of the time slot to signify its response to the node register command and its desire to request to register with interrogator node 102. In other embodiments, the transmitted response (i.e., response message) may be a signal at a predetermined signal level, a sequence of signals at varying signal levels, a predetermined sequence of one or more bits, and the like.

At step 1024, remote node 106 sets a tentatively registered flag to indicate its current status as tentatively registered with interrogator node 102. The tentatively registered flag may be maintained in memory 304. Subsequent to setting the tentatively registered flag, remote node 106 resumes processing, for example, command/response communications and various other functions.

Figure 11:
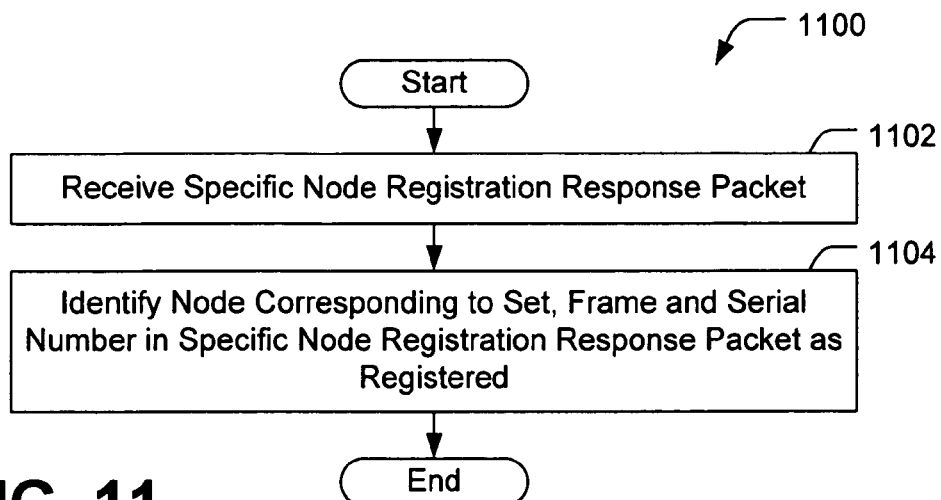
FIG. 11 illustrates a flow chart of one embodiment of a method by which an interrogator node processes a registration response from an addressed remote node, according to the present invention.

FIG. 11 illustrates a flow chart of one embodiment of a method 1100 by which interrogator node 102 processes a registration response from an addressed remote node 106, according to the present invention. Interrogator node 102 may have previously transmitted a specific node registration command packet, and the addressed remote node 106 may have transmitted a specific node registration response packet. Beginning at a start step, interrogator node 102 listens for and receives a specific node registration response packet at step 1102. For example, interrogator node 102 may continuously monitor communication component 208 for the receipt of messages, including specific node registration response packets.

At step 1104, interrogator node 102 determines the responding remote node 106 from, for example, the contents of the specific node registration response packet. Interrogator node 102 then identifies the responding remote node 106 as registered. In one embodiment, interrogator node 102 may identify registered remote nodes 106 in a registration table maintained on data store 206. The registration table may contain the identifier 306 of each registered remote node 106. Interrogator node 102 then resumes processing, for example, command/response communications and various other functions.

Figure 12:
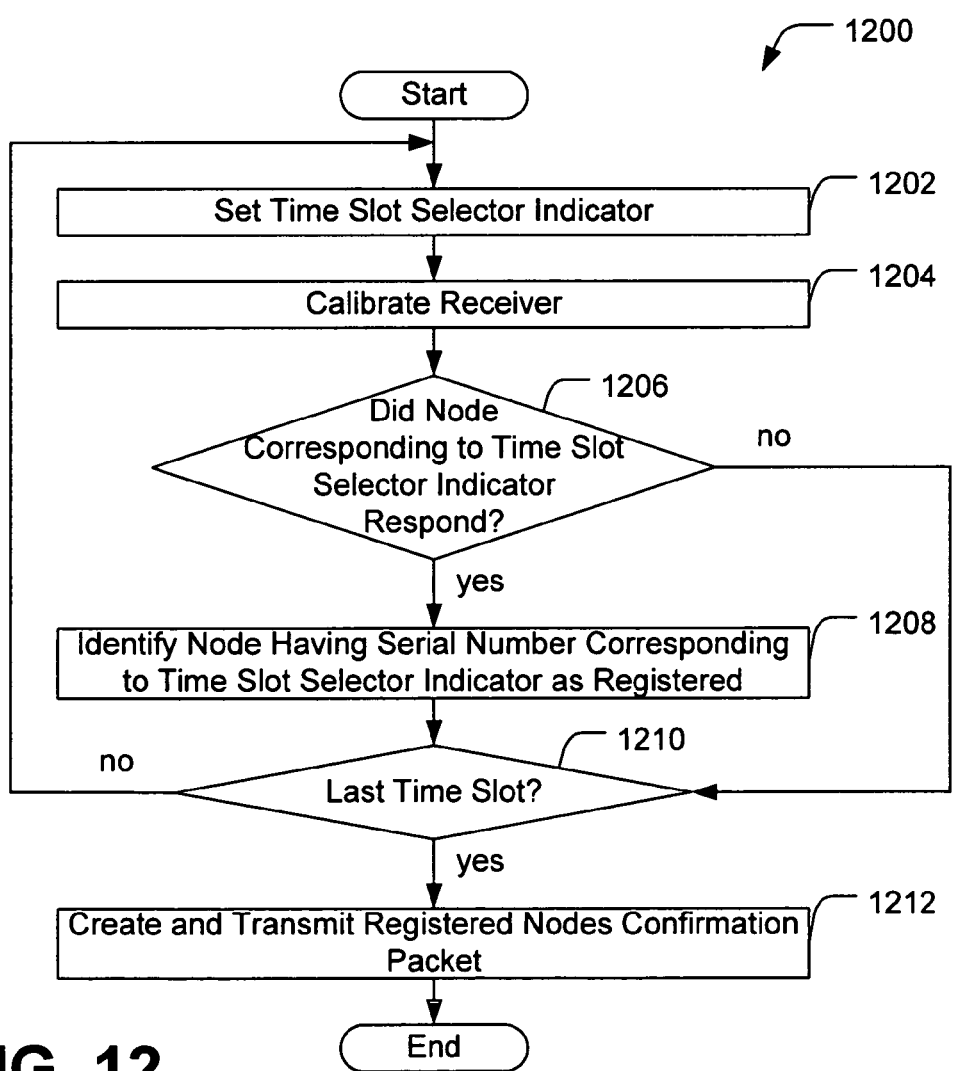
FIG. 12 illustrates a flow chart of one embodiment of a method by which an interrogator node processes messages received in response to a multiple node registration command packet, according to the present invention.

FIG. 12 illustrates a flow chart of one embodiment of a method 1200 by which interrogator node 102 processes messages received in response to a multiple node registration command packet, according to the present invention. Interrogator node 102 may have previously transmitted a multiple node registration command packet, for example, utilizing method 700 discussed above. Method 1200 is a process by which interrogator node 102, subsequent to transmitting the multiple node registration command packet, processes the response messages received in the corresponding time slots which were reserved for the transmission and receipt of the messages.

Beginning at a start step, interrogator node 102 sets a time slot selector indicator to a value that represents the time slot that is currently being processed at step 1202. For example, at a first iteration of method 1200, interrogator node 102 may set (or initialize) the time slot selector indicator to zero (0) to indicate that time slot 0 is currently being processed. Thus, interrogator node 102 knows that a message received during the current time slot would have been transmitted by remote node 106 having the addressed segment set and frame set numbers and a serial number equal to that of the time slot selector indicator (i.e., zero). In succeeding iterations of method 1200, interrogator node 102 may set the time slot selector indicator by incrementing the value of the time slot selector indicator.

Figure 13:
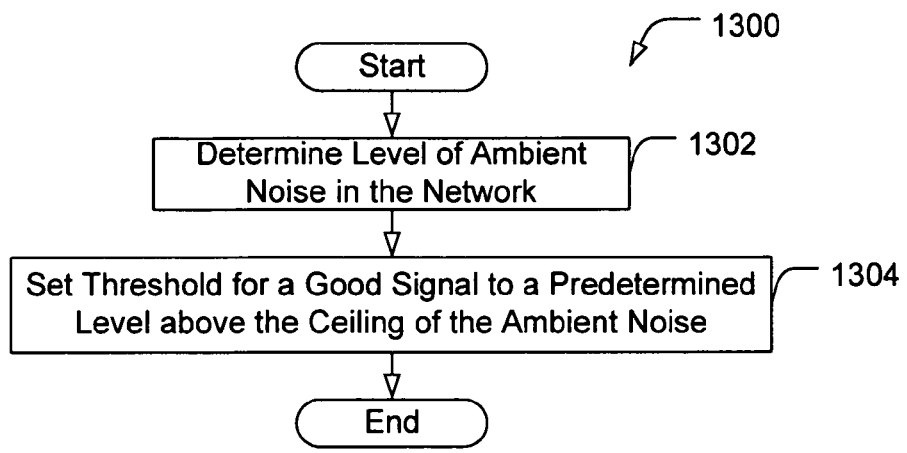
FIG. 13 illustrates a flow chart of one embodiment of a method by which an interrogator node calibrates its receiver, according to the present invention.

At step 1204, interrogator node 102 calibrates its receiver (i.e., communication component 208). FIG. 13 illustrates a flow chart of one embodiment of a method 1300 by which interrogator node 102 calibrates its receiver, according to the present invention. Beginning at a start step, interrogator node 102 determines the level of ambient noise in the network (i.e., network 104) at step 1302. In particular, interrogator node 102 monitors the network for substantially the duration of the calibration period (see FIG. 8) and establishes a ceiling for the detected ambient noise. For example, interrogator node 102 may listen to the network when the network is not active (i.e., there are not transmission occurring on the network) and measure the top of a bad signal. In this instance, the background noise is the bad signal.

Figure 14:
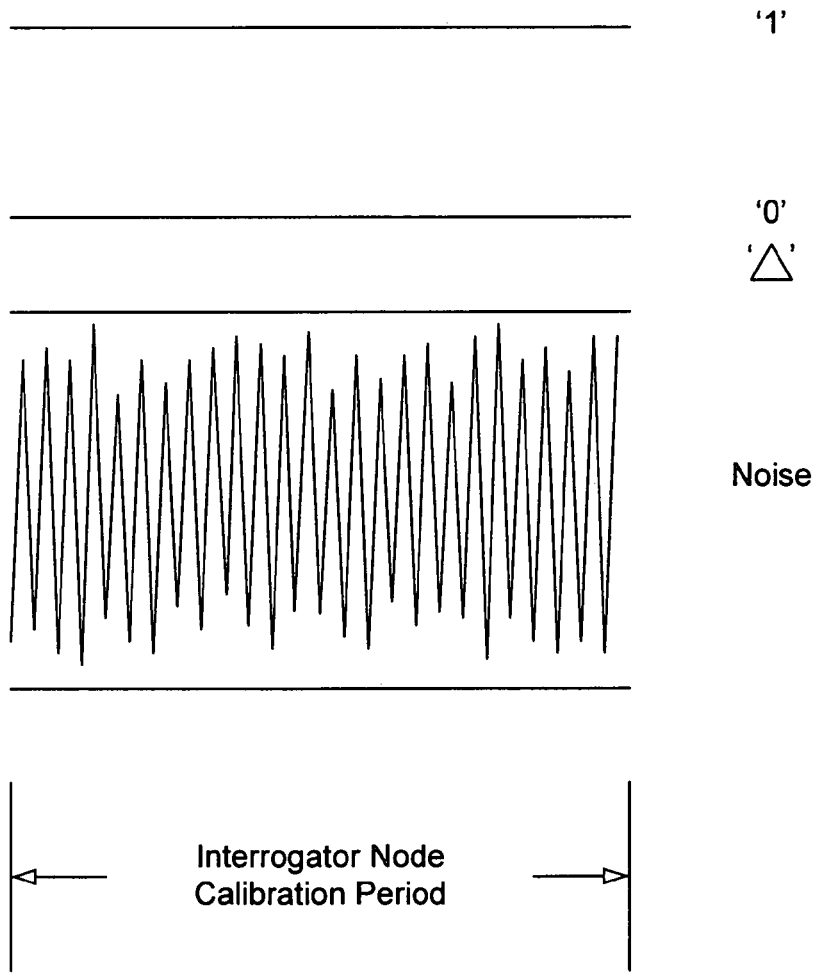
FIG. 14 illustrates an exemplary calibration period, according to one embodiment of the present invention.

At step 1304, interrogator node 102 sets the threshold for a good signal to a predetermined level above the ceiling of the ambient noise. The predetermined level is determined by factors such as, without limitation, the quality of the network, the transmission medium, sophistication of the communication equipment, FIG. 14 illustrates an exemplary calibration period, according to one embodiment of the present invention. As depicted, interrogator node 102 sets the threshold for a good signal to a predetermined value 'delta' above the top of the measured noise. A signal level at substantially the bottom or floor of the threshold for the good signal represents the value 'false' or '0'. A signal at a level incrementally higher level than the floor of the threshold for the good signal represents the value 'true' or '1'.

Subsequent to calibrating its receiver, at step 1206, interrogator node 102 determines whether the remote node 106 that corresponds to the time slot selector indicator responded to the previously transmitted multiple node registration command packet. In one embodiment, interrogator node 102 listens to the network to determine if a signal that signifies a 'true' or '1' is being transmitted. Interrogator node 102 monitors or listens to the network for this signal for the substantial remainder of the time slot duration (i.e., the duration of the time slot period remaining after the calibration period).

If, at step 1206, interrogator node 102 detects a transmission of a signal signifying a 'true' or '1', then, at step 1208, interrogator node 102 identifies the responding remote node 106 (i.e., remote node 106 having the addressed segment set and frame set numbers and the serial number corresponding to the time slot that is currently being processed) as registered. In one embodiment, interrogator node 102 may identify registered remote nodes 106 in the registration table maintained on data store 206.

Alternatively, if, at step 1206, interrogator node 102 fails to detect a transmission of a 'true' or '1' signal (i.e., interrogator node 102 detected a 'false' or '0' signal), or subsequent to detecting the transmission of a 'true' or '1' signal and identifying the transmitting remote node 106 as registered, interrogator node 102 determines if the time slot indicator is set to the last time slot at step 1210. If it is not the last time slot, then there are more time slots to process and interrogator node 102 proceeds to step 1202 to process the next time slot.

A 'false' or '0' signal detected during a time slot indicates that the corresponding remote node 106 (i.e., remote node 106 that is assigned to the time slot and which would have transmitted a response to the node register command) is not in the network and has not been registered. It may also indicate that the corresponding remote node 106 could not be heard by interrogator node 102 and has not been registered. This condition may indicate that the corresponding remote node 106 is not available to communicate with interrogator node 102 and may require interrogator node 102 to be physically moved and a new registration performed for the corresponding remote node 106.

Alternatively, if, at step 1210, interrogator node 102 determines that the last time slot has been processed, then, at step 1212, interrogator node 102 creates and transmits a registered nodes confirmation packet. The registered nodes confirmation packet may be broadcast by interrogator node 102 and is a message that identifies the recently registered remote nodes 106 (i.e., remote nodes 106 which were registered as a result of the current multiple node registration process).

Figure 15:
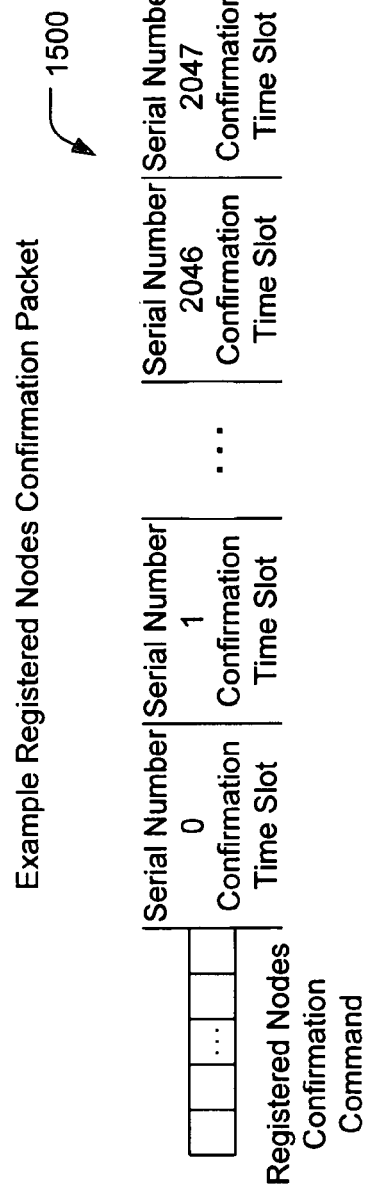
FIG. 15 illustrates an exemplary registered nodes confirmation packet, according to one embodiment of the present invention.

FIG. 15 illustrates an exemplary registered nodes confirmation packet 1500, according to one embodiment of the present invention. As depicted, packet 1500 is a bit sequence of zeros and ones followed by an appropriate number of time slot delays. By way of example, packet 1500 is composed of a plurality of bits which indicate that packet 1500 is a "registered nodes confirmation command," followed by 2,048 time slot delays. In one embodiment, during each time slot delay, interrogator node 102 transmits a 'true' or '1' signal if remote node 106 that corresponds to the time slot was registered as a result of responding to the multiple node registration command packet that is being currently processed. In other embodiments, similar to the response message, the transmitted signal may be a signal at a predetermined signal level, a sequence of signals at varying signal levels, a predetermined sequence of one or more bits, and the like.

For example, if remote node 106 having serial number 10 was recently registered, interrogator node 102 will transmit a 'true' or '1' signal during the eleventh time slot delay (note: time slot delays start at zero). Otherwise, interrogator node 102 will not transmit a signal (i.e., remain silent) during a time slot delay to signify that the corresponding remote node 106 has not been registered during the current multiple node registration process. Subsequent to creating and transmitting packet 1500, interrogator node 102 resumes processing, for example, command/response communications and various other functions.

Figure 16:
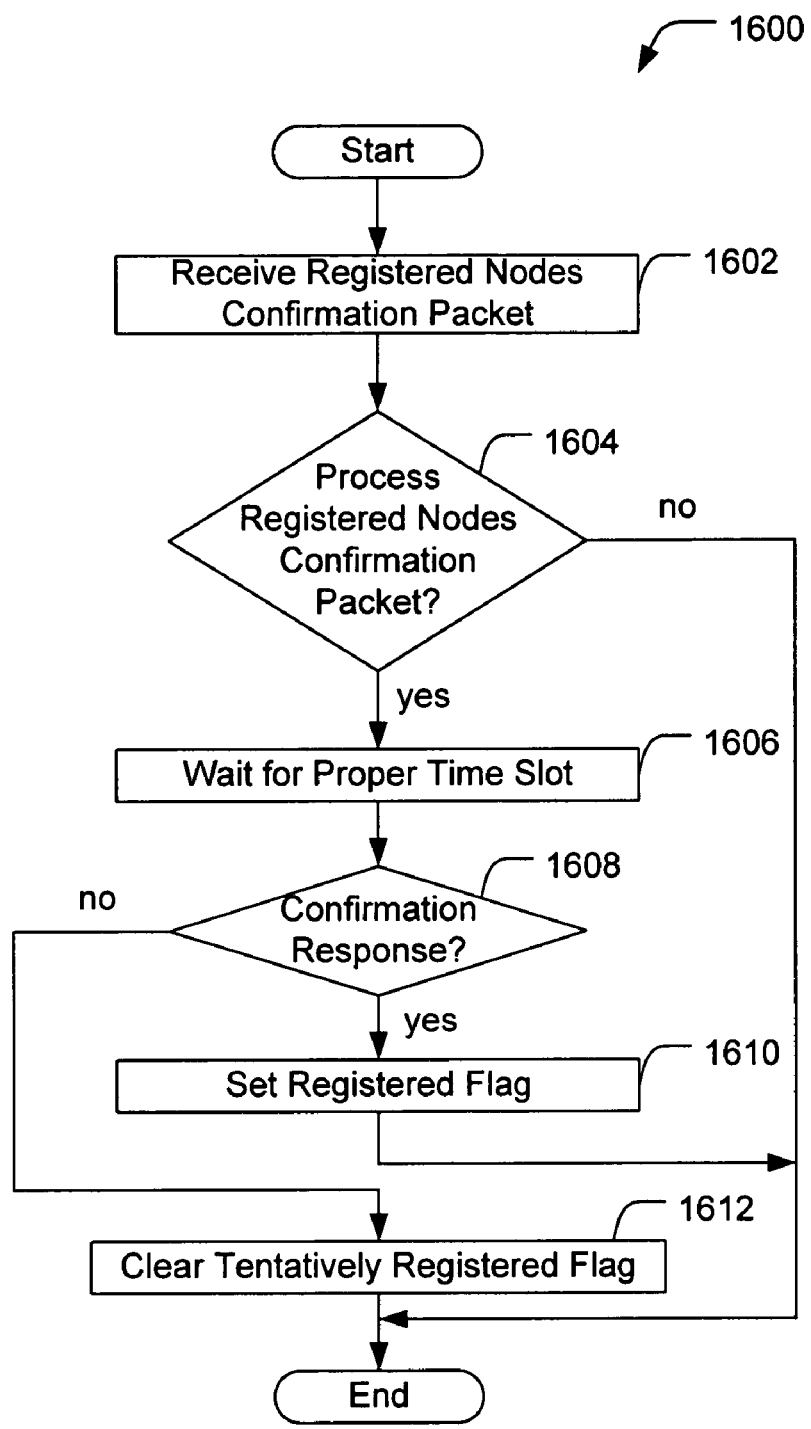
FIG. 16 illustrates a flow chart of one embodiment of a method by which a remote node processes a registered nodes confirmation packet, according to the present invention.

FIG. 16 illustrates a flow chart of one embodiment of a method 1600 by which remote node 106 processes a registered nodes confirmation packet 1500, according to the present invention. Remote nodes 106 monitor communication component 308 for the receipt of messages, including the registered nodes confirmation packet, received via network 104. Beginning at a start step, remote node 106 listens for and receives a registered nodes confirmation packet at step 1602.

At step 1604, remote node 106 determines whether it should process the received registered nodes confirmation packet. The registered nodes confirmation packet is a command that alerts registering remote nodes 106 to test their time slot and to verify that interrogator node 102 has heard their response and is identifying them as being registered. In one embodiment, remote node 106 may determine whether it should continue processing the registered nodes confirmation packet from the status of its tentatively registered flag.

For example, if remote node 106 is a registering remote node 106 (i.e., remote node 106 responded to the most recent multiple node registration command packet), its tentatively registered flag would be set and remote node 106 would be expecting a registered nodes confirmation packet. Conversely, if remote node 106 is not a registering remote node 106, then its tentatively registered flag would not be set and remote node 106 would not be expecting a registered nodes confirmation packet.

If, at step 1604, remote node 106 determines that it should not continue processing the registered nodes confirmation packet, then remote node 106 discards the registered nodes confirmation packet and resumes processing, for example, command/response communications and various other functions. Alternatively, if, at step 1604, remote node 106 determines that it should continue processing the registered nodes confirmation packet, then, at step 1606, remote node 106 waits for the proper time slot. Remote node 106 determines the proper time slot from its serial number.

At step 1608, remote node 106 determines whether it received a confirmation response during its time slot. Remote node 106 listens to the network during its designated time slot for a confirmation response signal. In one embodiment, a 'true' or '1' signal indicates a confirmation from interrogator node 102 that remote node 106 has been registered. If remote node 106 fails to receive or detect a confirmation response during its time slot, then, at step 1612, remote node 106 clears its tentatively registered flag and resumes processing, for example, command/response communications and various other functions.

Alternatively, if, at step 1608, remote node 106 receives or detects a confirmation response during its time slot, then, at step 1610, remote node 106 sets a registered flag to indicate its current status as registered with interrogator node 102. Remote node 106 also clears its tentatively registered flag and resumes processing, for example, command/response communications and various other functions.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

What is claimed is:

1. A method for deterministic registration for communication networks comprising:
    transmitting a node register command over a network, the node register command comprising a plurality of bits, the plurality of bits addressing a range of potential nodes;
    determining, by a particular node and based upon the plurality of bits, whether the particular node corresponds to the range of potential nodes;
    determining, by the particular node and based upon the plurality of bits and an identifier of the particular node, a corresponding time delay;
    listening to the network for a response from a node in the range of nodes;
    determining, based upon the time slot delay in which the response is received, the particular node in the range of nodes from which the response was received;
    responsive to detecting the response, registering the node;
    during a first portion of the time slot delay, determining a level of ambient noise in a network;
    determining a ceiling of the level of ambient noise;
    setting a threshold for a good signal to a predetermined level above the ceiling of the level of ambient noise; and
    during a second portion of the time slot delay, listening to the network for a signal.

2. The method of claim 1 further comprising:
    creating a confirmation packet; transmitting the confirmation packet; and
    during the corresponding time slot delay, transmitting a signal based on a registration stabs of the particular node, the signal being a confirmation of the registration of the particular node.

3. The method of claim 2 further comprising, during the time slot delay, not transmitting a signal if the corresponding node is not registered.

4. The method of claim 1 further comprising, the time slot delay, calibrating a receiver during a first portion of the time slot delay.

5. The method of claim 1, wherein the time slot delay is a response period during which at most one node may transmit a message in response to the node register command.

6. The method of claim 1, where in the plurality of bits comprises a first plurality of bits and a second plurality of bits.

7. The method of claim 6, wherein the second plurality of bits are padded with zeros.

8. The method of claim 6, wherein the node register command further comprises a third plurality of bits.

* * * * *